United States Patent [19]

Nakayama et al.

[11] Patent Number: 4,495,142
[45] Date of Patent: Jan. 22, 1985

[54] MONITORING SYSTEM FOR MONITORING STATE OF NUCLEAR REACTOR CORE

[75] Inventors: Tadakazu Nakayama; Ryozo Tsuruoka; Masaki Matsumoto, all of Hitachi, Japan

[73] Assignee: Hitachi, Ltd., Tokyo, Japan

[21] Appl. No.: 245,515

[22] Filed: Mar. 19, 1981

[30] Foreign Application Priority Data

Mar. 19, 1980 [JP] Japan ............................ 55-35345

[51] Int. Cl.³ ............................................. G21C 17/00
[52] U.S. Cl. ................................... 376/251; 376/253
[58] Field of Search ............. 376/251, 253, 256, 250, 376/309, 313, 314, 245

[56] References Cited

U.S. PATENT DOCUMENTS

| | | | |
|---|---|---|---|
| 2,523,868 | 8/1970 | Dady | 376/253 |
| 3,258,403 | 6/1966 | Malay | 376/250 |
| 3,288,998 | 11/1966 | Press, Jr. | 376/256 |
| 3,712,850 | 1/1973 | Campbell et al. | 376/250 |
| 3,788,813 | 1/1974 | Busch | 376/256 |
| 3,982,129 | 9/1976 | Lattin et al. | 376/256 |
| 4,032,395 | 6/1977 | Burnette | 376/253 |
| 4,204,908 | 3/1980 | Michaelis et al. | 376/251 |

FOREIGN PATENT DOCUMENTS 2603031 9/1976 Fed. Rep. of Germany ...... 376/253
51-65295 6/1976 Japan .

*Primary Examiner*—Sal Cangialosi
*Attorney, Agent, or Firm*—Antonelli, Terry & Wands

[57] ABSTRACT

The nuclear reactor container of a boiling water reactor has a dry well and a pressure suppression chamber. The level of the radioactivity in the cooling water filling the pressure suppression chamber is measured by a liquid radiation monitor. An iodine monitor measures a level of the radioactivity of the iodine in the space above the surface of cooling water in the pressure suppression chamber, while a noble gas monitor measures a level of the radioactivity of noble gas in the same space. Outputs from the liquid radiation monitor, the iodine monitor and the noble gas monitor are delivered to an accident judging device which makes judgement as to occurrence of perforation of fuel rods and melt down of fuel rods in the event of a Loss Of Coolant Accident (LOCA), the result of which is displayed at a display device.

13 Claims, 11 Drawing Figures

MONITORING SYSTEM FOR MONITORING STATE OF NUCLEAR REACTOR CORE

The present invention relates to a system for monitoring the state of a nuclear reactor core and, more particularly, to a monitor system for monitoring the state or condition of a nuclear reactor core, employing a radiation monitor suitable for monitoring the state of a nuclear reactor core at the time of loss of coolant accident (referred to as LOCA, hereinafter).

The boiling water reactor has a reactor containment vessel consisting of a dry well and a pressure suppression chamber. The reactor pressure vessel is placed in the dry well, while the pressure suppression chamber is filled with cooling water. In the event of a LOCA in the boiling water reactor, the cooling water of high pressure and temperature in the pressure vessel is dischaged as steam into the dry well through the fractured portion of the primary loop recirculation system. This steam is introduced into the pressure suppression chamber and is condensed by the cooling water in the latter.

As disclosed in Japanese Patent Laid-open Publication No. 65295/76, a radiation meter, thermometer, pressure gauge and a condensate drain level meter are installed in the dry well of the boiling water reactor, in order to monitor the leakage of the cooling water due to LOCA. This monitoring system permits the operator to confirm occurrence of LOCA, but cannot provide accurate information concerning the state or condition of fuel rods in the reactor core after occurrence of LOCA. Therefore, with this known monitor system, it is not possible to take suitable countermeasures after the occurrence of the LOCA.

SUMMARY OF THE INVENTION

It is, therefore, a major object of the invention to accurately determine the state of fuel rods after occurrence of LOCA.

To this end, according to the invention, there is provided a monitoring system comprising: means for measuring a level of the radioactivity of iodine in the primary containment vessel of a nuclear reactor; means for measuring a level of the radioactivity of noble gas; and means for judging or determining the state or condition of fuel rods in the reactor core in the event of occurrence of LOCA, upon receipt of the output from the means for measuring the level of the radioactivity of iodine and the output from the means for measuring the level of the radioactivity of noble gas.

DETAILED DESCRIPTION OF THE PREFERRED EMBODIMENTS

Figure 1:
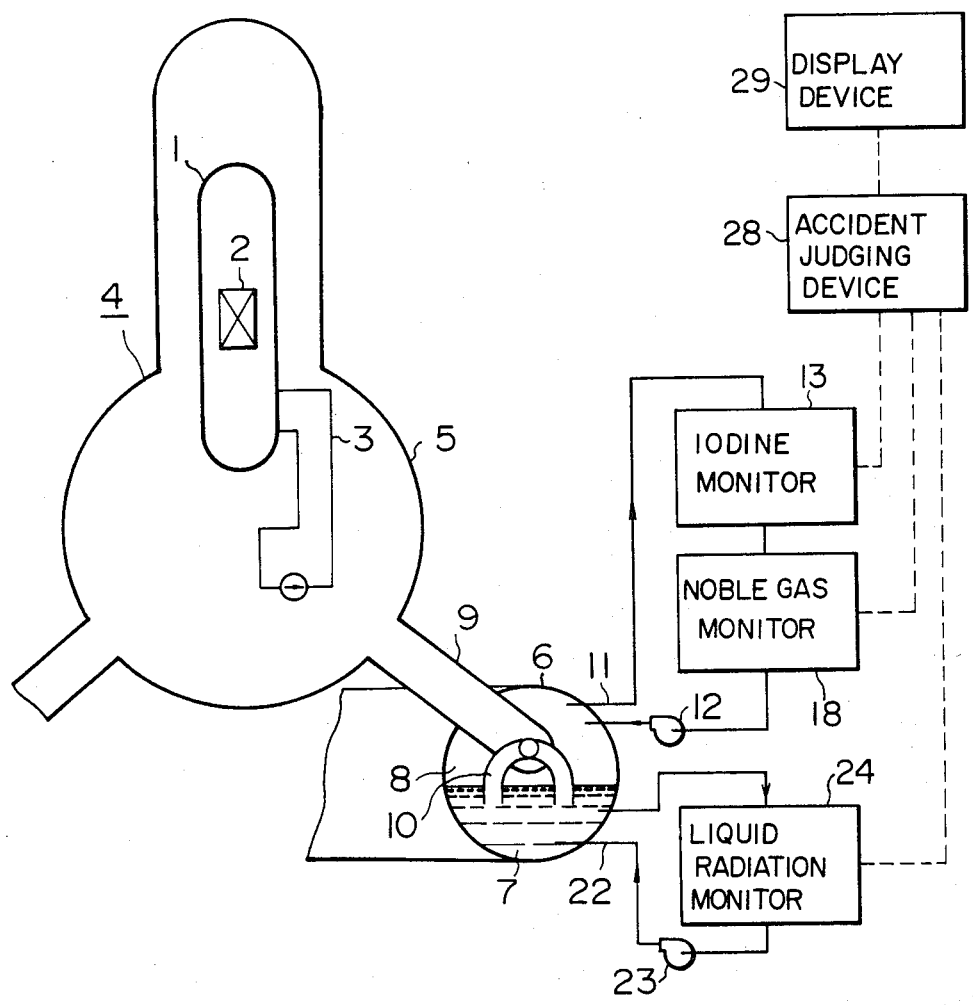
FIG. 1 is a system diagram of a monitoring system for monitoring the state of a nuclear reactor core constructed in accordance with an embodiment of the invention, applied to a boiling water reactor.

As a result of various studies and experiments, the present inventors have found that the occurrence of an LOCA can easily be recognized and the state of fuel rods after occurrence of the LOCA can be determined, through measurement of levels of radioactivities in iodine and noble gas in the primary containment vessel of the reactor, as will be understood from the following description.

An iodine monitor and a noble gas monitor, which are adapted to measure a level of the radioactivity in the radioactive iodine and that of the radioactive noble gas in the pressure suppression chamber, respectively, are incorporated in the monitor system of the invention. The system further has a liquid radiation monitor adapted for measuring a level of the radioactivity in the cooling water within the pressure suppression chamber. The radioactivities measured by the iodine monitor, the noble gas monitor and the liquid radiation monitor are expressed by X, Y and Z $\mu$ci/cc, respectively.

The following information is derived from these measured radioactivities. Namely, $(X+Y)$ shows the level of the total radioactivity in the gas layer within the pressure suppression chamber, while $(X+Y+Z)$ shows the level of the total radioactivity in the pressure suppression chamber. The value $(X+Z)$ represents the level of the total radioactivity of iodine in the gas and the liquid layers within the pressure suppression chamber, because the radioactivity in the liquid layer is carried almost fully by the iodine.

The value $[Y/(X+Z)]$ shows the ratio of the radioactivity between the radioactive noble gas and the radioactive iodine. Among this information, $(X+Y+Z)$ and $[Y/(X+Z)]$ are useful in judging (a) normal operation of the nuclear reactor, (b) flow of cooling water into the pressure suppression chamber in the event of LOCA, (c) perforation of fuel in the event of LOCA and (d) melt down of fuel in the event of LOCA.

(a) Normal Operation of Nuclear Reactor

The level of the radioactivity of the cooling water in the pressure suppression chamber during normal operation of the nuclear reactor is about $10^{-3}$ $\mu$ci/cc. Almost no radioactive noble gas exists in the pressure suppression chamber. Therefore, the following condition is met during the normal operation of the nuclear reactor.

$$X+Y+Z \leqq 10^{-3} \, (\mu\text{ci/cc})$$

$$Y/(X+Z) < 10^{-3} \tag{1}$$

(b) Flow of Cooling Water from Pressure Vessel into Pressure Suppression Chamber The cooling water discharged in the state of steam from the pressure vessel into the dry well, in the event of an LOCA, is condensed into water upon contact with the cooling water pooled in the pressure suppression chamber. Provided that there is no perforation of the fuel rod in the nuclear reactor core, the level of the radioactivity in the cooling water in the pressure suppression chamber is increased by at least one decimal place due to the flowing of the cooling water into the pressure suppression chamber. If there is no perforation of the fuel rods, there is almost no noble gas in the pressure suppression chamber. Therefore, in the event that the cooling water in the pressure vessel has been discharged into the pressure suppression chamber, the relationship represented by the following equations (2) is established.

$$X+Y+Z > 10-3 \sim 10^{-2} \ (\mu ci/cc)$$

$$Y/(X+Z) < 10^{-3} \quad (2)$$

(c) Perforation of Fuel in the Event of LOCA

In the case where some fuel rods in the reactor core are broken, noble gas and iodine which have been stored in the fuel rod due to fission of uranium are discharged to the outside. If all of the fuel rods in the reactor core are broken, the radioactive noble gas and radioactive iodine in the gas layer of the pressure suppression chamber are increased to $10^3$ $\mu ci/cc$ and $10$ $\mu ci/cc$, respectively. The level of the radioactivity in the cooling water within the pressure suppression chamber in this state is measured to be $10^2$ $\mu ci/cc$. Therefore, the following relationships are established in the event of perforation of all fuel rods in the reactor core.

$$X+Y+Z \geq 10^3 \ (\mu ci/cc)$$

$$Y/(X+Z) \cong 9.1 \quad (3)$$

If the number of broken fuel rods is smaller, the $(X+Y+Z)$ and $Y/(Y+Z)$ take values smaller than those of equations (3).

(d) Fuel Melt Down in the Event of LOCA

In the event of perforation and melt down of all fuel rods in the reactor core, the levels of the radioactivities of the radioactive noble gas and the radioactive iodine are $10^5$ $\mu ci/cc$ and $10^3$ $\mu ci/cc$, respectively. The level of radioactivity in the radioactive iodine in cooling water of the pressure suppression chamber is $10^4$ $\mu ci/cc$. Therefore, the following relationships are established when all of the fuel are broken and have suffered a melt down in the event of LOCA.

$$X+Y+Z \geq 10^5 \ (\mu ci/cc)$$

$$Y/(X+Z) \cong 9.1 \quad (4)$$

A monitor system for monitoring the state of a reactor core constructed in accordance with a preferred embodiment of the invention, making use of the relationships expressed by the equations (1) to (4) will be described hereinunder with reference to the accompanying drawings. This embodiment is applied to a boiling water reactor. The primary containment vessel 4 of the boiling water reactor consists of a dry well 5 and a pressure suppression chamber 6 both of which are closed vessels. The pressure suppression chamber 6 is ring-shaped and is filled with cooling water. A bent pipe 9 communicated with the dry well 5 is inserted into the pressure suppression chamber 6. A downcomer pipe 10 is connected at its one end to the bent pipe, while the other end of the downcomer pipe 10 is immersed in the cooling water. A gas layer 8 is formed on the surface of the cooling water 7 in the pressure suppression chamber 6. A nuclear reactor pressure vessel 1 having a core 2 therein is disposed in the dry well 5.

Figure 2:
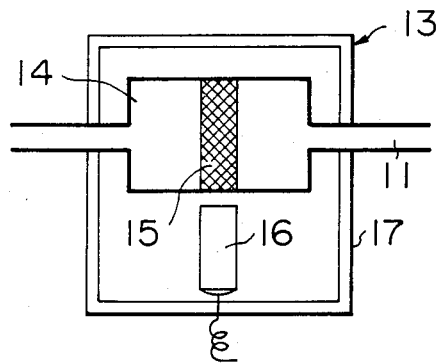
FIG. 2 shows the detail of an iodine monitor incorporated in the system shown in FIG. 1.
Figure 3:
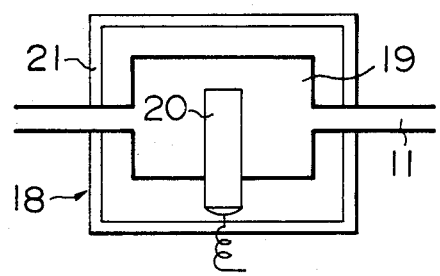
FIG. 3 shows the detail of a noble gas monitor incorporated in the system shown in FIG. 1.

A pipe 11 communicates at its both ends with the gas layer 8 in the pressure suppression chamber 6. The pipe 11 is provided with a blower 12. An iodine monitor 13 and a noble gas monitor 18 are installed in the pipe 11. The constructions of the iodine monitor 13 and the noble gas monitor 18 will be described in detail hereinunder with specific reference to FIGS. 2 and 3. The iodine monitor 13 has an iodine filter 15 disposed in a chamber 14 provided in the pipe 11. A radiation detector 16 is disposed at the outside of the chamber 14. The chamber 14 and the radiation detector 16 are surrounded by a radiation shielding body 17. The noble gas monitor is constituted by a chamber 19 provided in the pipe 11 and a radiation detector 20 disposed in the chamber 21. The chamber 19 and the radiation detector 20 are surrounded by a radiation shielding body 21.

Figure 4:
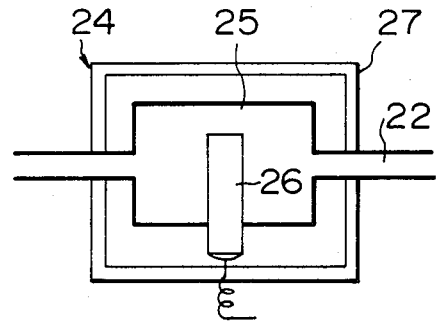
FIG. 4 shows the detail of a liquid radiation monitor incorporated in the system shown in FIG. 1.

A pipe 22 has both ends placed in the cooling water 7 in the pressure suppression chamber 6. A pump 23 and a liquid radiation monitor 24 are provided in the pipe 22. The liquid radiation monitor 24 has a construction as shown in FIG. 4. A chamber 25 for receiving a radiation detector 26 are provided in the pipe 22. A radiation shielding body 27 surrounds the chamber 25 and the radiation detector 26.

The monitoring system for monitoring the state of a reactor core in accordance with the present invention is constituted by an iodine monitor 13, a noble gas monitor 18, a liquid radiation monitor 24, an accident judging device 28 and a display device 29.

The monitoring system of the first embodiment having the construction described hereinbefore operates in a manner explained hereinunder. Since the blower 12 is driven continuously, the gas constituting the gas layer in the pressure suppression chamber is circulated through the pipe 11 so that levels of the radioactivities in the radioactive iodine gas and the radioactive noble gas in the circulated gas are measured by the radiation detectors 16 and 20 of the iodine monitor 13 and the noble gas monitor 18. The outputs from these detectors are then delivered to the accident judging device 28 which may be a computer. Since the pump 23 operates continuously, the cooling water 7 in the pressure suppression chamber 6 is continuously circulated in the pipe 22. The level of the radioactivity in the cooling water 7 is measured by the radiation detector 26 of the liquid radiation monitor 24, and is delivered to the accident judging device 28. The accident judging device 28 operates to judge the state of the reactor core in accordance with the flow chart shown in FIG. 5, the result of which is shown at the display device 29.

The function of the accident judging device 28 will be explained hereinunder with reference to FIG. 5. In the case where the boiling water reactor operates safely, the accident judging device 28 receiving the outputs from the radiation detectors 16, 30 and 26 makes, at a step M1, a judgment concerning the condition of $X+Y+Z \leq 10^{-3}$ $\mu ci/cc$. In this case, since the levels of outputs from the detectors are low, the judging device 28 provides an answer YES. In this case, the display device 29 makes a display of "NO LOCA" in red.

The LOCA takes place when there is a rupture in the reactor pressure vessel 1 or in the recirculation pipe 3.

The cooling water of high-pressure and temperature in the pressure vessel 1 is discharged as steam of high temperature and pressure through the fractured portion to fill the dry well 5. The steam is then introduced by the bent pipe 9 and the downcomer pipe 10 into the cooling water 7 in the pressure suppression chamber 6 so as to be cooled and condensed upon contact with the cooling water 7. Once the LOCA takes place, the cooling water in the pressure vessel is scattered away so that an emergency core cooling system (not shown) is started to spray cooling water into the pressure vessel 1.

Figure 6:
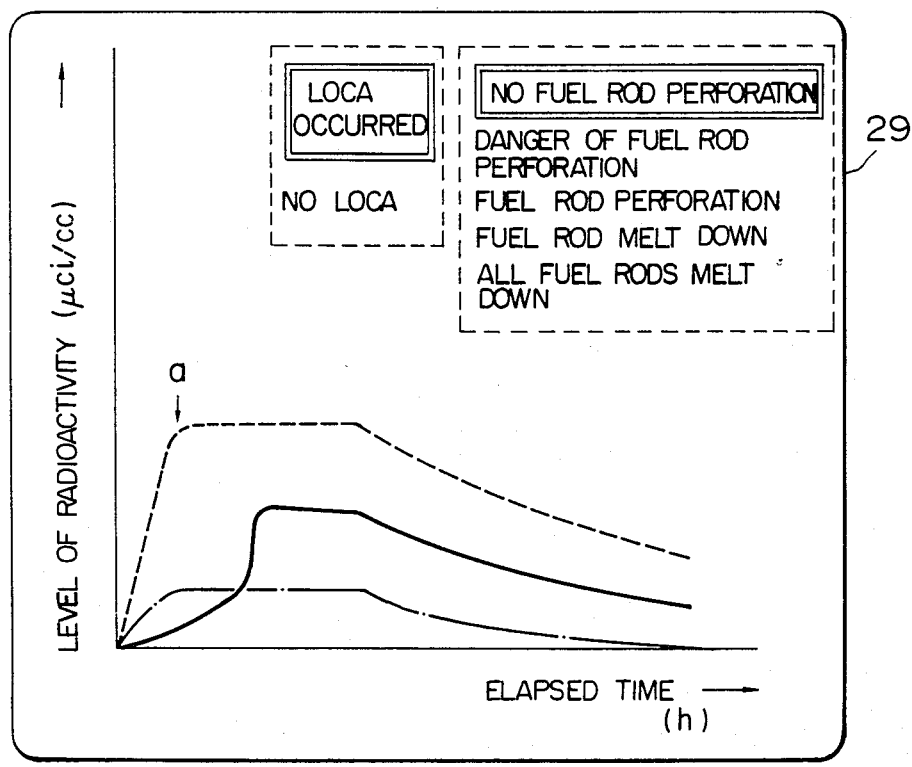
FIG. 6 shows the state of an image surface of a display device when there is a flow of coolant into the pressure suppression chamber due to an LOCA.

The level of the radioactivity in the pressure suppression chamber 6 changes in a manner shown in FIG. 6, in the case where there is no fuel rod perforation in the reactor core 2 in the pressure vessel 1 of the nuclear reactor, in the event of an LOCA.

FIG. 6 shows the state of an image surface of the display device 29. More specifically, in FIG. 6, the full-line curve shows the output from the radiation detector 16 of the iodine monitor 13, i.e. the level of radioactivity in the radioactive iodine in the gas layer 8, while the one-dot-and-dash line curve in the same Figure shows the output from the radiation detector 20 of the noble gas monitor 18, i.e. the level of the radioactivity in the radioactive noble gas in the gas layer 8. Also, the broken-line curve shows the output of the radiation detector 26 of the liquid radiation monitor 24, i.e. the level of the radioactivity of radioactive iodine in the cooling water 7. As mentioned before, almost all of the radioactivity in the cooling water 7 is carried by radioactive iodine.

Once the LOCA takes place, the steam of cooling water discharged from the pressure vessel 1 into the dry well 5 flows into the pressure suppression chamber 6 so that the level of the radioactivity in the cooling water 7 is abruptly increased as shown by broken line in FIG. 6 (Point a). After the occurrence of the LOCA, the liquid radiation monitor 24 indirectly measures the level of the radioactivity of the condensate liquid of the steam discharged into the dry well 5. Since the radioactive iodine in the cooling water 7 moves into the gas layer 8, the level of the radioactivity measured by the iodine monitor 13 increases as shown by the full-line curve. However, the output from the noble gas monitor (one-dot-and-dash line) does not increase substantially. In this case, the accident judging device 28 makes a judgement at step M1 of FIG. 5 in accordance with the equations (2) mentioned before, using the outputs from respective radiation detectors, and provides a conclusion NO. Then, the judging device 28 makes a judgement at step M2 as to whether the condition of $Y/(X+Z)<10^{-3}$ is met. In the case where there is no perforation of the fuel rod, the judging device 28 provides an answer YES as a result of judgement in the step M2. Therefore, the display device 29 makes a display of "LOCA OCCURRED" and "NO FUEL ROD PERFORATION" in red, as shown in FIG. 6. The fact that the condition of judgement at step M1 is not met means the occurrence of a LOCA.

Figure 7:
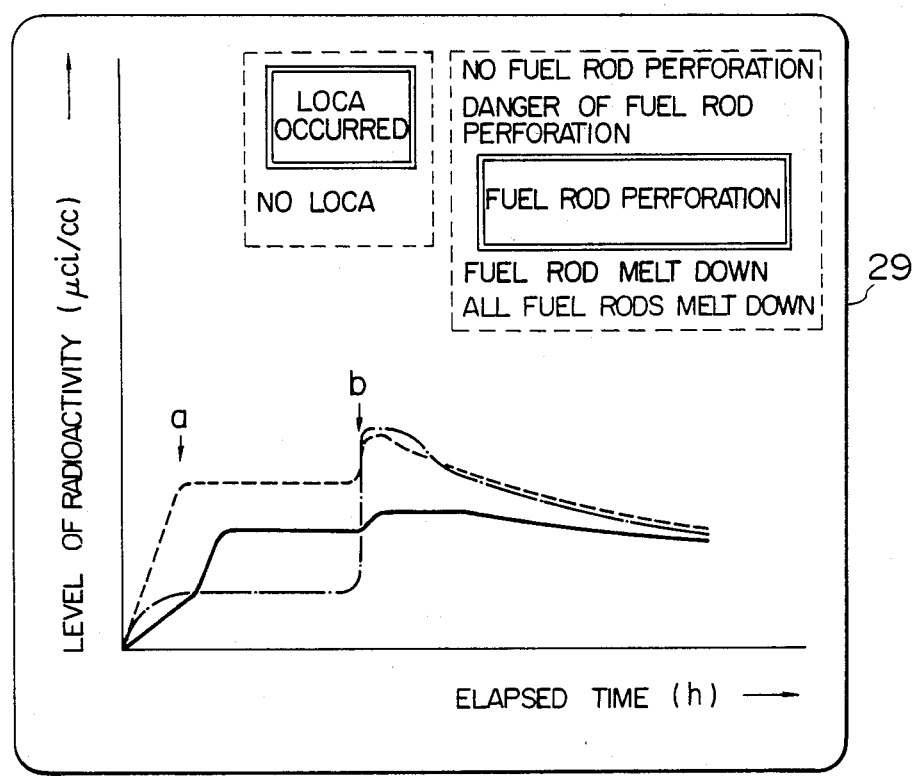
FIG. 7 shows the state of the image surface of the display device when there is a perforation of fuel rod in the event of the LOCA.

If there is a perforation of fuel rods in the reactor core 2 after occurrence of a LOCA, the level of the radioactivity in the pressure suppression chamber 6 is changed in a manner shown in FIG. 7. The fuel-line curve, one-dot-and-dash line curve and broken-line curve in FIG. 7 correspond to those in FIG. 6. Thus, FIG. 7 shows that a LOCA has taken place at the moment (a) and that a perforation of a fuel rod took place at a moment (b). If there is any perforation of a fuel rod in the reactor core 2, a large amount of radioactive noble gas is discharged from the broken fuel rods. As this noble gas reaches the gas layer 8 in the pressure suppression chamber 6, the level of the radioactivity (one-dot-and-dash line) measured by the noble gas monitor 18 is increased abruptly. In this case, the accident judging device 28 provides an answer NO in each of the steps of M1 and M2 of the judgement. The accident judging device 28 then makes a judgement at a step M3 as to whether the condition of $Y/(X+Z)<9$ is met, and provides an answer YES. The accident judging device 28 then makes a judgement as to whether the condition of $X+Y+Z<10^{-2}$ μci/cc is met at a step M4. An answer NO is obtained as a result of judgement in this step so that the display device 29 makes a display of "LOCA OCCURRED" and "FUEL ROD PERFORATION" in red. If the perforation of the fuel rod is not spreading, the amount o2f radioactive substance discharged from the fuel rod is not spreading, the amount of radioactive substance discharged from the fuel rod is decreased gradually. In addition, the radioactive substance decays gradually. Therefore, the level of the radioactivity in the pressure suppression chamber 6 is gradually decreased as shown in FIG. 7.

Thus, it is possible to know whether the perforation of fuel rod is continuously spreading or not, through continuous measurement of a level of the radioactivity in the pressure suppression chamber 6. Namely, if the perforation of fuel rod is not spreading any more, the level of radioactivity in the pressure suppression chamber 6 is decreased in accordance with the following equation.

$$C = \Sigma C_{io} \cdot exp(-\lambda i \cdot t) \quad (5)$$

where, C represents the level of the radioactivity after elapse of time (t) from the moment of occurrence of the LOCA, Cio represents the level of the radioactivity of a radioactive substance (i) at a moment immediately after the occurrence of LOCA and λi represents the decay constant of the radioactive substance (i).

Figure 5:
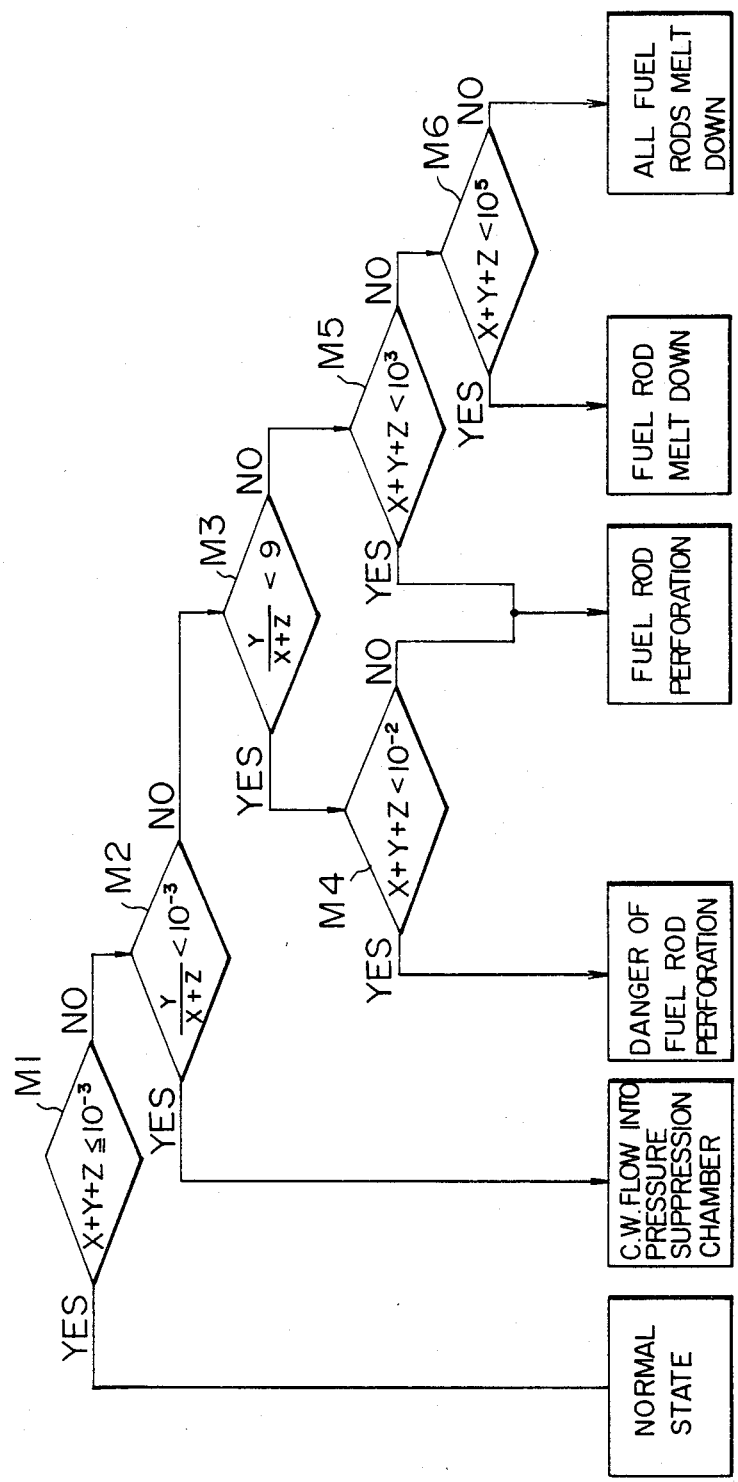
FIG. 5 is a flow chart of an accident judging device incorporated in the system shown in FIG. 1.

Although not shown in FIG. 5, the accident judging device 28 can make a judgement as to whether the perforation of a fuel rod is taking place continuously, by determining the change of the level of the radioactivity after the occurrence of the perforation of fuel rod.

In the even that an answer YES is obtained as a result of the judgement in the step M4, there is a fear that the fuel rod in the reactor core 2 may be broken. In this case, the display device 29 makes a display of "LOCA OCCURRED" and "DANGER OF FUEL ROD PERFORATION" in red. The value $10^{-2}$ μci/cc used in the judgement at step M4 is derived from equations (2).

In the event that an answer NO is obtained as a result of the judgement at the step M3, a judgement is made at a step M5 as to whether the condition of $X+Y+Z<10^3$ μci/cc is met. If an answer YES is given in the judgement at the step M5, the display device 29 makes a display of "LOCA OCCURRED" and "FUEL ROD PERFORATION" in red, as in the case where the answer NO is obtained at stem M4.

Figure 8:
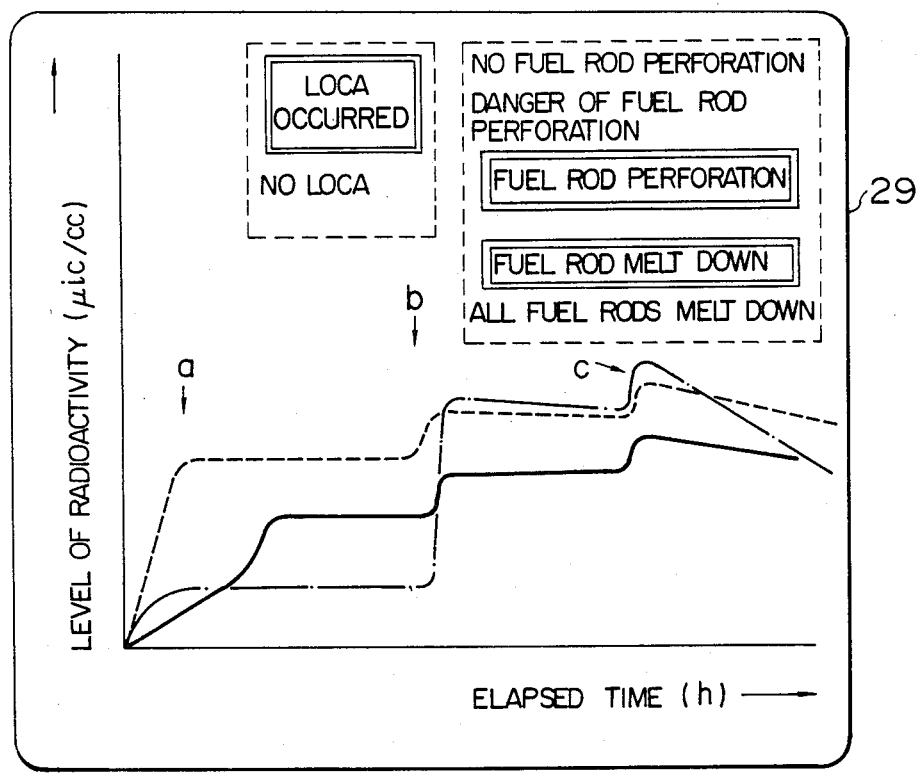
FIG. 8 shows the state of the image surface of the display device when there is a melt down of fuel rod in the event of the LOCA.

When the fuel rod in the reactor core 2 has suffered a melt down after an occurrence of LOCA, the level of the radioactivity in the pressure suppression chamber 6 changes in a manner shown in FIG. 8. The full-line curve, one-dot-and-dash line curve and broken-line curve of this Figure correspond to those in FIG. 6. In FIG. 8, (a) and (b) represent the moments at which the LOCA took place and at which the fuel rod perforation took place, respectively, while (c) represents the moment at which the fuel rod starts to melt down. As the fuel rod starts to melt down, the outputs from three radiation detectors 16, 20 and 26 exhibit a drastic rise.

The accident judging device 28 provides an answer NO as a result of the judgement in each of the steps M1 to M3 and M5. Then, a step M6 is taken to make a judgement as to whether the condition of $X+Y+Z<10^5$ μci/cc is met. An answer YES obtained as a result of the judgement in step M6 means that all of the fuel rods in the reactor core 2 have been broken and a part of these fuel rods have started to melt down. In this case, "LOCA OCCURRED", "FUEL ROD PERFORATION" and "FUEL ROD MELT DOWN" are put on display in red. On the other hand, an answer NO obtained as a result of the judgement in step M6 means that all of the fuel rods in the reactor core 2 started to melt down. In this case, the display "FUEL ROD MELT DOWN" as obtained when the answer is YES is substituted by "ALL FUEL RODS MELT DOWN".

Thus, in the monitoring system of the first embodiment, it is possible to detect the occurrence of an LOCA, and to determine the state of fuel rods in the reactor core, i.e. the occurrence of perforation and melt down of fuel rods after the occurrence of the LOCA. It is also possible to know whether the perforation of the fuel rod is continuously spreading or not. Accordingly, it becomes possible to take suitable countermeasures without delay after the occurrence of LOCA.

The monitoring system of the first embodiment described heretofore has quite a simple construction. Namely, only one pipe is used to introduce the gas of the gas layer 8 to the iodine monitor 13 and the noble gas monitor 18. In addition, since the noble gas monitor 18 is disposed at the downstream side of the iodine monitor 13, it is possible to measure the concentrations of the radioactive iodine and the radioactive noble gas in the gas layer 8 at a high accuracy, with a simple construction. This is because the iodine is adsorbed by the iodine filter 15 of the iodine monitor 13 so that the gas flowing through the chamber 19 of the noble gas monitor 18 contains only the noble gas.

Figure 9:
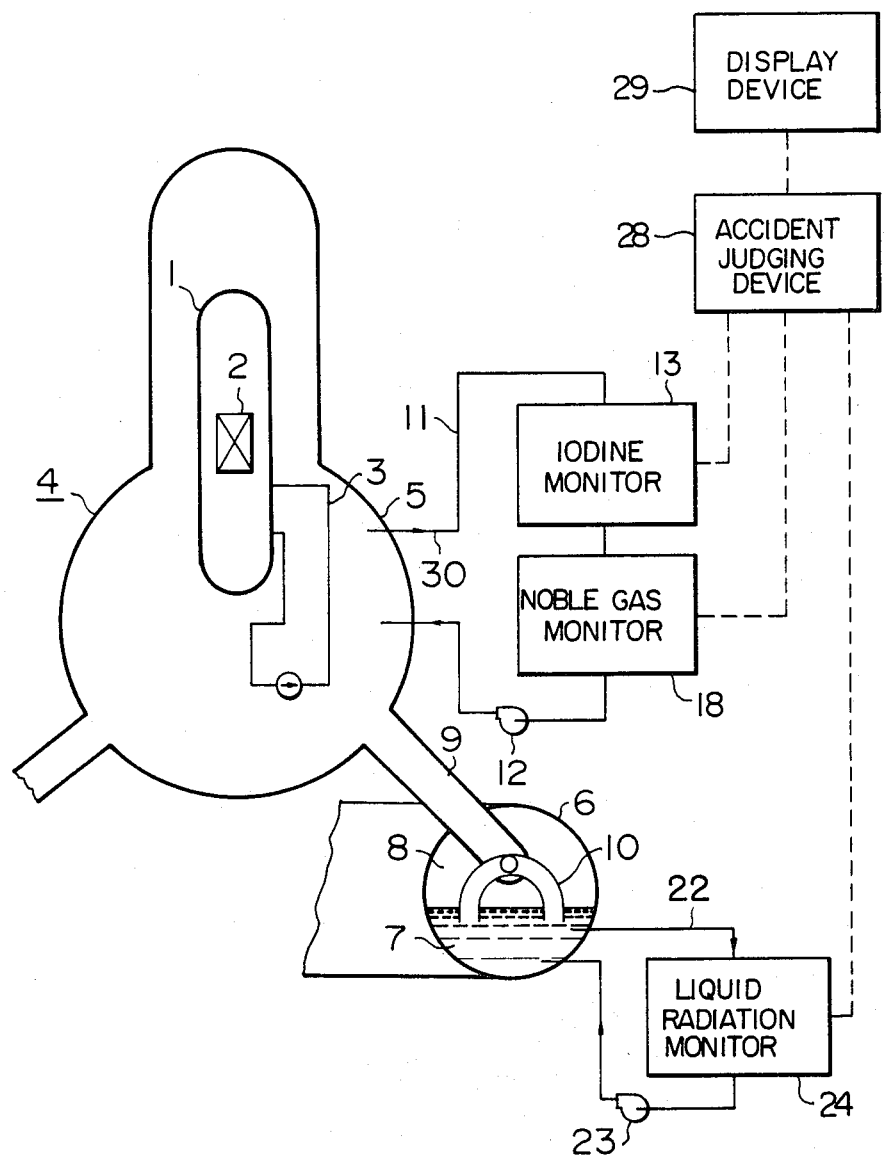
FIGS. 9 and 10 are system diagrams of different embodiments applied to a boiling water reactor.

FIG. 9 shows another embodiment of the invention, in which the same reference numerals are used to denote the same parts as those in the first embodiment. In this embodiment, the pipe 30 having the iodine monitor 13 and the noble gas monitor 18 are connected at its both ends to the dry well 5 so that the levels of the radioactivities of radioactive iodine and radioactive noble gas in the dry well 5 are measured by the iodine monitor 13 and the noble gas monitor 18. It will be seen to those skilled in the art that this embodiment offers the same advantages as the first embodiment described in connection with FIGS. 1 to 8.

Figure 10:
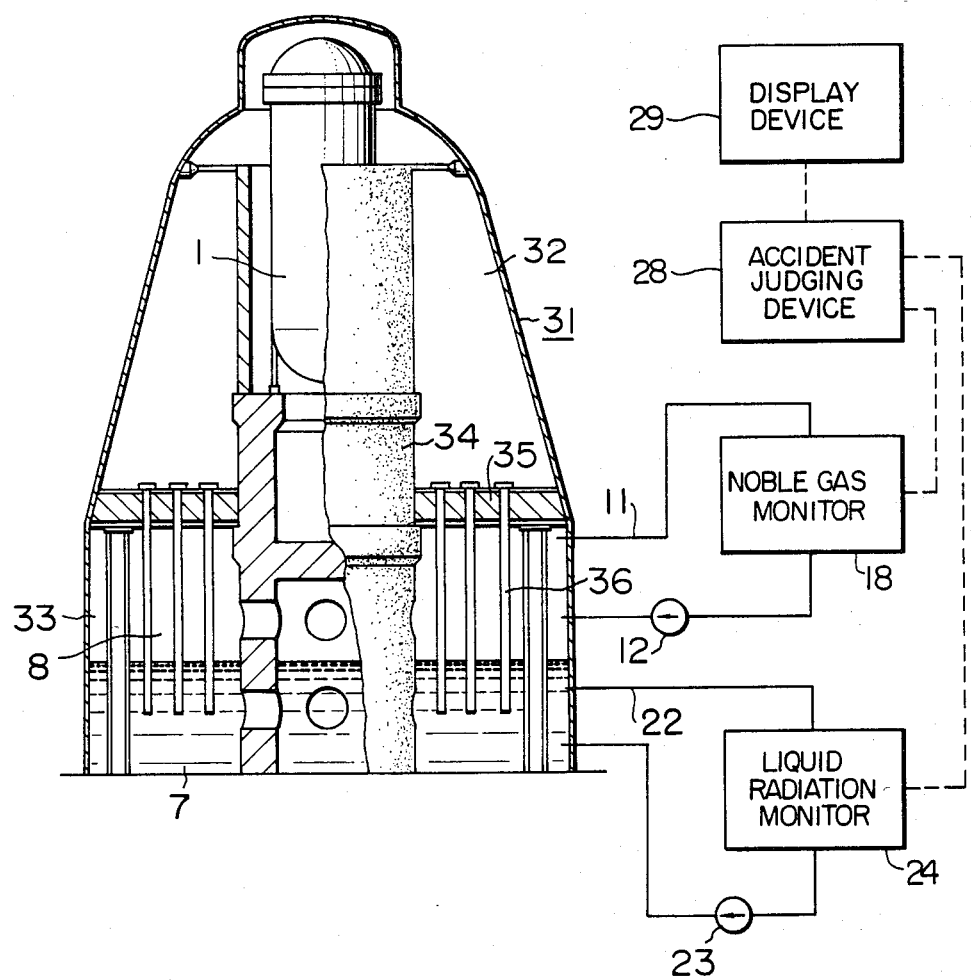

FIG. 10 shows still another embodiment of the invention applied to another type of a reactor container of the boiling water reactor. The container 31 is constituted by a dry well 32 and a pressure suppression chamber 33. The pressure vessel 1 disposed in the dry well 32 is installed on a pedestal 34. The dry well 32 and the pressure suppression chamber 33 are separated from each other by means of a diaphragm floor 35 secured to the pedestal 34. A bent pipe 36 attached to the diaphragm floor 35 is immersed in the cooling water 7 in the pressure suppression chamber 33. The pipe 11 connected to the gas layer 8 in the pressure suppression chamber 33 is provided with the noble gas monitor 18. Another pipe 22 having the liquid radiation monitor 24 therein is immersed at its both ends in the cooling water within the pressure suppression chamber 33. In the monitoring system for monitoring the reactor core in accordance with this embodiment, the levels of radioactivities measured by the noble gas monitor 18 and the liquid radiation monitor 24 are delivered to the accident judging device 28 for the judgement of the state of the reactor core. In this embodiment, the accuracy of the judgement is somewhat low as compared with those in the preceding embodiments, because the information concerning the radioactivity of iodine is not available, but the state of fuel rods in the reactor core can be determined with a satisfactorily high reliability.

The monitoring system as shown in FIG. 1 can be applied to the nuclear reactor core container 31 as shown in FIG. 10. Also, the monitoring system shown in FIG. 10 may be applied to the container shown in FIG. 1.

A still another embodiment of the invention applied to a pressurized water type nuclear reactor will be described hereinunder with specific reference to FIG. 11.

Figure 11:
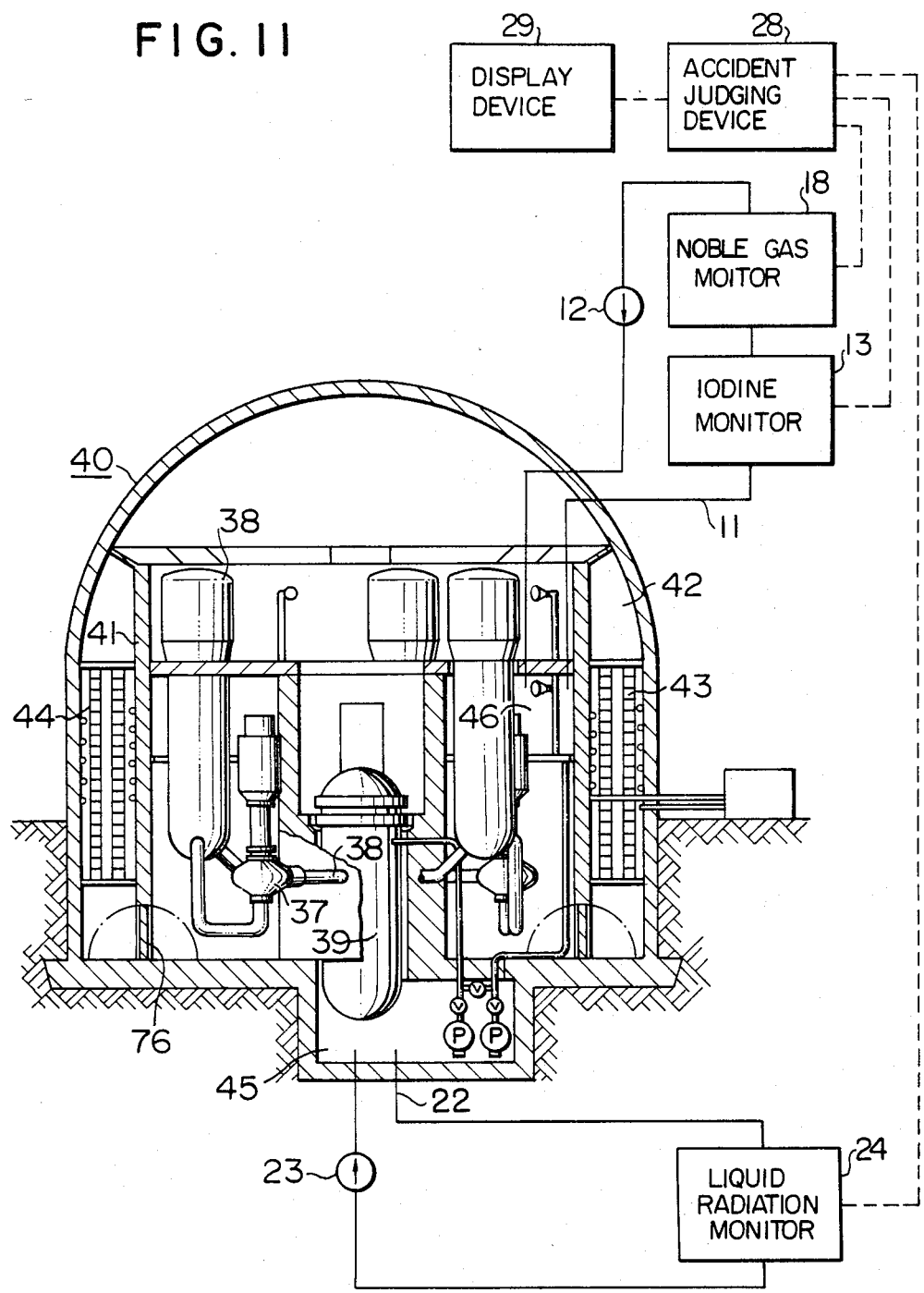
FIG. 11 is a system diagram of a different embodiment of the invention applied to a pressurized water reactor.

In FIG. 11, there is shown a nuclear reactor core container 40 of the same type as that shown at FIG. 1 of the specification of U.S. Pat. No. 3,423,286. This container 40 contains a coolant pump 37, a steam generator 38 and a reactor vessel 39. An annular secondary shielding wall 41 is extended along the inner peripheral wall of the container 40. The space between the inner peripheral surface of the container 40 and the secondary shielding wall 41 constitutes a condenser chamber 42 having a multiplicity of shelves 44 made of wire gauze and storing ice 43. A water pool 45 is preserved at the bottom portion of the nuclear reactor container 40.

The iodine monitor 13 and the noble gas monitor 18 are installed in the pipe 11 which opens at its both ends in the space 46 within the container 10, while the liquid radiation monitor 24 is disposed in the pipe 22 which is communicated at its both ends with the water in the water pool 45.

In the event of a rupture in the primary pipe system interconnecting the coolant pump 37, the steam generator 38 and the reactor core vessel 39, the cooling water (coolant) in the reactor core vessel 39 is discharged in the state of steam into the space 46 within the container 40. That is the occurrence of LOCA. The steam then flows into the condenser chamber 42 to come into contact with the ice 43 so as to be condensed by the latter. The water produced as a result of the condensation flows into the water pool 45. When the water level gauge for detecting the water level in the water pool 45 has detected a water level higher than a predetermined level, a pump 23 is started to introduce the water from the water pool 45 to the liquid radiation monitor 24 where the level of radioactivity (mainly radioactivity of radioactive iodine) is measured. The blower 12 is driven continuously to permit the measurement of concentrations of the radioactive iodine and the radioactive noble gas in the gas staying within the space 46 by the iodine monitor 13 and the noble gas monitor 18. The values measured by respective monitors are delivered to the accident judging device 28 which makes the judgement of the state of the reactor core in the same manner as the first embodiment shown in FIG. 1. In this embodiment, the pressure in the space 46 is measured continuously to sense the occurence of LOCA from the change in the pressure. It will be seen that the same advantages as those provided by the preceding embodiments are derived also from this embodiment.

As has been described, the present invention makes it possible to accurately grasp the state of fuel rods in the reactor core after occurrence of LOCA, to permit the operator to take any necessary and suitable countermeasures to prevent the accident from being developed, thereby to contribute greatly to the safety of the nuclear reactor.

We claim:

1. A monitoring system for monitoring the state of the core of a nuclear reactor, comprising: a first pipe communicated at its both ends with the gas layer in a nuclear reactor container housing a nuclear reactor vessel; gas transferring means provided in said first pipe; first means provided in said first pipe for measuring a level of the radioactivity of iodine; second means provided in said first pipe at the downstream side of said first means for measuring a level of the radioactivity of noble gas; a second pipe communicated at its both ends with a space which is to be filled with the coolant in the liquid state discharged out of said nuclear reactor vessel; means disposed in said second pipe for transferring said coolant in the liquid state; third means disposed in said second pipe for measuring a level of the radioactivity of iodine in the coolant in the liquid state; judging means for determining, upon receipt of the outputs from said first means, second means and third means, a condition of fuel rods in said nuclear reactor vessel; and means for displaying the condition of the fuel rods as determined by said judging means.

2. A monitoring system as claimed in claim 1, wherein said judging means determines as the condition of the fuel rods at least one of occurrence of perforation and melt down of the fuel rods in response to the outputs of said first, second and third measuring means and a ratio of the output of the second measuring means to the sum of the outputs of the first and third measuring means.

3. A monitoring system for monitoring the condition of a nuclear core, comprising: iodine gas measuring means for measuring a level of the radioactivity of the iodine in the gas in a nuclear reactor container housing a nuclear reactor vessel and for providing an output indicative thereof, noble gas measuring means for measuring a level of the radioactivity of noble gas in the nuclear reactor container and for providing an output indicative thereof, iodine liquid measing means for measuring a level of the radioactivity of iodine in the coolant which has been discharged from the inside of the nuclear reactor vessel to the space inside the nuclear reactor container in a liquid state and for providing an output indicative thereof, judging means for determining as a condition of fuel rods in the reactor core at least one of the occurrence of perforation and the occurrence of melt down of the fuel rods in accordance with the outputs of the iodine gas measuring means, iodine liquid measuring means and noble gas measuring means, and a ratio of the output of the noble gas measuring means to the outputs of the iodine gas and liquid measuring means, and display means for displaying the condition of the fuel rods determined by the judging means.

4. A monitoring system as claimed in claim 3, wherein the ratio of the output of the noble gas measuring means to the outputs of the iodine gas and liquid measuring means is a ratio of the output of the noble gas measuring means to the sum of the outputs of the iodine gas and liquid radiation measuring means.

5. A monitoring system as claimed in claim 4, wherein the judging means determines the condition of the occurrence of perforation of the fuel rods in accordance with the relationship of the sum of the outputs of the noble gas measuring means and the outputs of the iodine gas and liquid radiation measuring means to a first value and in accordance with the relationship of the ratio to a second value.

6. A monitoring system as claimed in claim 5, wherein the judging means determines the condition of occurrence of melt down of fuel rods at least in accordance with the relationship of the sum of the outputs of the noble gas measuring means and the outputs of the iodine gas and liquid radiation measuring means to a third value.

7. A monitoring system as claimed in claim 6, wherein said nuclear reactor container is a container of a boiling water reactor including a dry well and a pressure suppression chamber, the judging means determining as a condition of the fuel rods whether the perforation of the fuel rods is continuously spreading after the occurrence of a loss of coolant accident (LOCA), the noble gas, and iodine gas and liquid measuring means continuously measuring the level of the radioactivity in the pressure suppression chamber, the judging means determining that the perforation of the fuel rods is not spreading when the level of the radioactivity in the pressure suppression chamber decreases in accordance with the equation $$C = \Sigma Cio \cdot exp(-\lambda i \cdot t)$$

where, C represents the level of the radioactivity after elapse of time (t) from the moment of occurrence of the LOCA, Cio represents the level of the radioactivity of a radioactive substance (i) at a moment immediately after the occurrence of LOCA and λi represents the decay constant of the radioactive substance (i).

8. A monitoring system for monitoring the condition of a nuclear reactor core comprising: first means for measuring a level of the radioactivity of iodine in a gas layer within a nuclear reactor container housing a nuclear reactor vessel; second means for measuring a level of the reactivity of noble gas in said nuclear reactor container; third means for measuring a level of the radioactivity of a liquid layer within said nuclear reactor container; judging means including a first means responsive to outputs of said first, second and third measuring means for summing the outputs of said first, second, and third measuring means and for comparing the sum with a first predetermined value, and a second means responsive to the outputs of said first, second and third measuring means for providing a ratio between the output of said second measuring means and a sum of the outputs of said first and third measuring means and for comparing the ratio with a second predetermined value; and display means for displaying conditions of fuel rods in accordance with the results of the comparisons.

9. A monitoring system as claimed in claim 8, wherein said nuclear reactor container is a container of a boiling water reactor comprising a drywell and a pressure suppression chamber.

10. A monitoring system as claimed in claim 9, wherein said judging means determines as a condition of the fuel rods an occurrence of a perforation of the fuel rods and whether the perforation of the fuel rods is continuously spreading after the occurrence of a loss of coolant accident (LOCA), said first, second and third measuring means continuously measuring the level of the radioactivity in the pressure suppression chamber, said judging means determining that the perforation of the fuel rods is not spreading when the level of the radioactivity in the pressure suppression chamber decreases in accordance with the equation, $$C = \Sigma C_{io} \cdot exp(-\lambda_i \cdot t)$$

where, C represents the level of the radioactivity after elapse of time (t) from the moment of occurrence of the LOCA, $C_{io}$ represents the level of the radioactivity of a radioactive substance (i) at a moment immediately after the occurrence of LOCA and $\lambda_i$ presents the decay constant of the radioactive substance (i).

11. A monitoring system as claimed in claim 8, wherein said third means measures a level of the radioactivity of iodine in the liquid layer.

12. A monitoring system as claimed in claim 8, wherein said judging means includes a third means responsive to the outputs of said first, second and third measuring means for providing a ratio between the output of said second measuring means and a sum of the outputs of said first and third measuring means and for comparing the ratio to a third predetermined value, and a fourth means responsive to the outputs of said first, second and third measuring means for summing the outputs of said first, second and third measuring means and for comparing the sum with one of a fourth and fifth predetermined value in dependence upon the comparison of the ratio with said third predetermined value.

13. A monitoring system as claimed in claim 10, wherein said judging means includes a fifth means responsive to the outputs of said first, second and third measuring means for summing the outputs of said first, second and third measuring means and for comparing the sum with a sixth predetermined value in dependence upon the results of the comparison of the sum with said fifth predetermined value.

* * * * *